(12) United States Patent
Gauffriau et al.

(10) Patent No.: US 8,346,464 B2
(45) Date of Patent: Jan. 1, 2013

(54) METHOD AND DEVICE FOR AIDING THE AIRPORT NAVIGATION

(75) Inventors: Adrien Gauffriau, Toulouse (FR); Eric Albert, Pamiers (FR)

(73) Assignee: Airbus Operations SAS, Toulouse (FR)

( * ) Notice: Subject to any disclaimer, the term of this patent is extended or adjusted under 35 U.S.C. 154(b) by 926 days.

(21) Appl. No.: 12/426,814

(22) Filed: Apr. 20, 2009

(65) Prior Publication Data

US 2009/0265089 A1 Oct. 22, 2009

(30) Foreign Application Priority Data

Apr. 22, 2008 (FR) ...................................... 08 02236

(51) Int. Cl.
*G06F 19/00* (2006.01)
(52) U.S. Cl. ......... 701/120; 701/117; 701/431; 701/437
(58) Field of Classification Search .................. 701/117, 701/120, 409, 431, 437, 439, 454
See application file for complete search history.

(56) References Cited

U.S. PATENT DOCUMENTS

| 6,571,166 | B1 | 5/2003 | Johnson |
| 6,731,226 | B2* | 5/2004 | Walter ........................ 340/972 |
| 7,342,514 | B1 | 3/2008 | Bailey |
| 7,382,284 | B1* | 6/2008 | Armstrong et al. ........... 340/958 |
| 7,764,198 | B2* | 7/2010 | Brehin et al. ................. 340/973 |
| 7,844,392 | B2* | 11/2010 | Dubourg ....................... 701/120 |
| 7,974,773 | B1* | 7/2011 | Krenz et al. .................. 701/120 |
| 2005/0154505 | A1 | 7/2005 | Nakamura |
| 2007/0299597 | A1 | 12/2007 | Fetzmann |
| 2008/0195301 | A1* | 8/2008 | Fabre et al. ................... 701/120 |
| 2009/0045982 | A1* | 2/2009 | Caillaud et al. .............. 340/972 |

FOREIGN PATENT DOCUMENTS

| EP | 1 887 542 | 2/2008 |
| FR | 2 901 903 | 12/2007 |
| GB | 1 313 912 | 4/1973 |

OTHER PUBLICATIONS

Preliminary Search Report dated Nov. 27, 2008 w/ English translation.

* cited by examiner

*Primary Examiner* — Kaitlin Joerger
*Assistant Examiner* — Ernesto Suarez
(74) *Attorney, Agent, or Firm* — Dickinson Wright PLLC

(57) ABSTRACT

Disclosed is a method and device for aiding ground navigation of an aircraft on an airport in which a current position and current heading of the aircraft are determined by a set of information sources. A first determination unit determines, according to the determined current position and current heading, and according to information obtained from an airport database, a current traffic lane on which the aircraft is situated, and parameters relating to a next intersection of the current traffic lane. Parameters relating to the next intersection include the position of the next intersection; and the distance between the next intersection and the current position of the aircraft. A head-up display unit overlays, on an environment in front of the aircraft, a first symbol illustrating the determined current traffic lane and a set of second symbols illustrating the determined parameters of the next intersection.

10 Claims, 4 Drawing Sheets

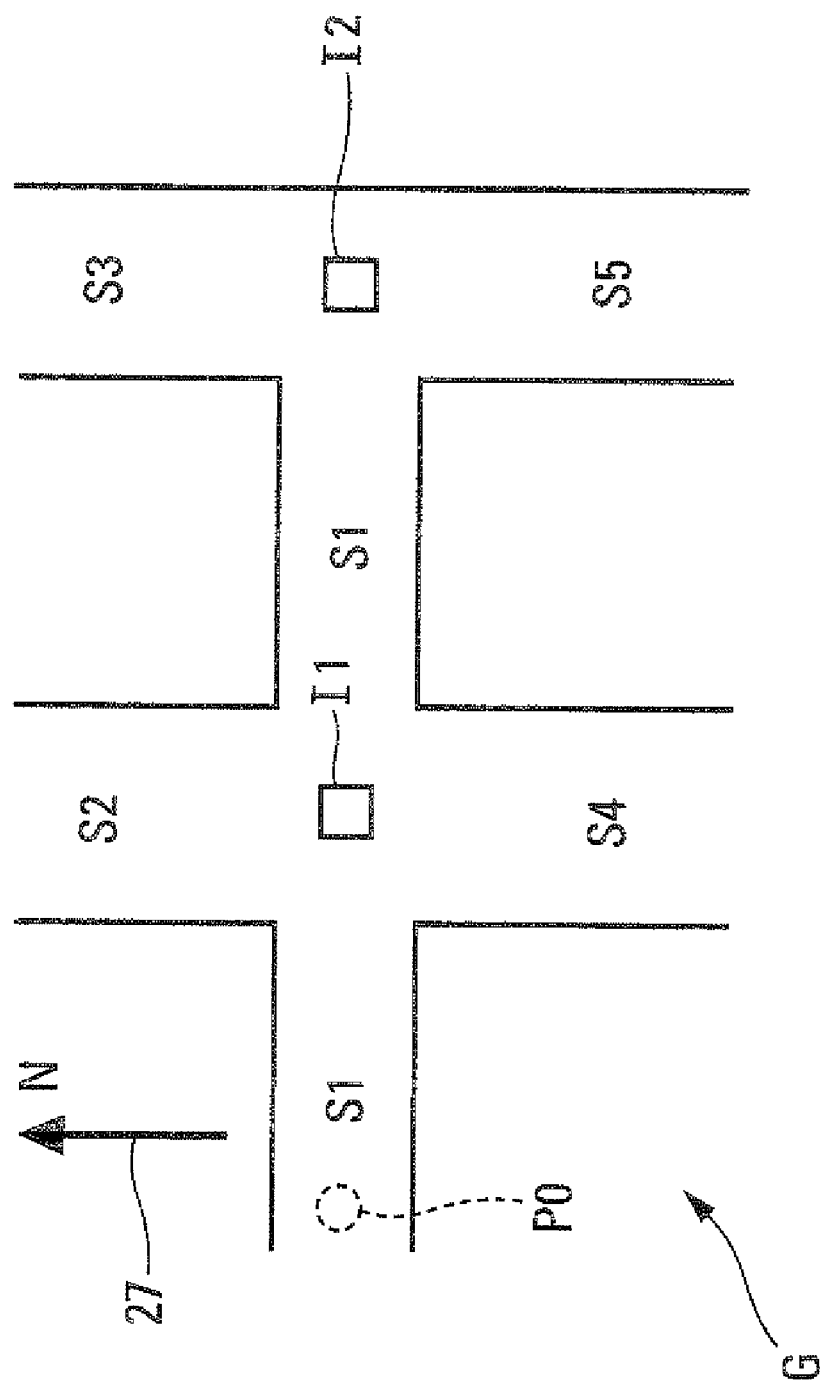

METHOD AND DEVICE FOR AIDING THE AIRPORT NAVIGATION

FIELD OF THE INVENTION

The present invention relates to a method and a device for aiding the ground navigation of an aircraft, in particular of a transport aircraft, on an airport.

BACKGROUND OF THE INVENTION

During an airport ground rolling phase, the pilot of an aircraft generally receives an authorization from the control tower to follow a route around the traffic lanes of the airport. He uses airport maps which are printed on paper or which are displayed on a viewing screen of head-down type, to get his bearings and correctly follow the authorization given by the controller. For this purpose, the pilot compares his position with respect to the map with the aid of panels situated on the verges of the traffic lanes. The pilot is also responsible, during the rolling phases, for discharging an anti-collision function, that is to say for avoiding a collision with any craft, mobile or not, situated on a traffic lane, thus implying that he is permanently aware of the environment outside the aircraft. He must of course also ensure that the wheels of the aircraft do not leave the pavement of the traffic lane followed.

There are devices for aiding airport ground navigation which comprise a display system of head-up or HUD ("Head-Up Display") type and which provide indications as regards the position of the wheels, the trajectory to be followed and the instruction to be applied in order to avoid leaving the traffic lanes, while following the authorization given by the controller.

A method and a device for aiding the ground navigation of an aircraft on an airport is known from document FR-2 901 903.

Depending on the complexity of the airport and the meteorological conditions, the pilot's task may be made more complicated and give rise to errors which lead to non-compliance with the authorization given by the controller. By way of example, heavy fog makes it difficult or indeed impossible to read the panels on the verge of the traffic lanes. This may lead to erroneous knowledge of the position on the traffic lanes and therefore to a wrong path being taken at the next intersection. The rolling authorization is then no longer complied with. Such a situation can become very dangerous when this error results in entry to a runway (landing or takeoff) without having received prior authorization.

Another problem which exists during such a rolling phase is that the pilot is responsible for discharging an anti-collision function, thus implying that his gaze is fixed outside. Such a situation is incompatible with the reading of the map (on paper or on a head-down screen) of the airport so as, for example, to ascertain the names of the traffic lanes at the next intersection and the direction to be taken.

Additionally, the use of a device for aiding airport navigation, such as aforementioned, in general requires that this device know the track along which the controller authorizes the aircraft to roll. As most ground rolling authorizations are provided with the aid of a radiocommunication, the pilot must enter this information manually into the device. This task can be laborious when the authorization is long and complicated. Moreover, if the authorization is modified during rolling, it is necessary to enter the new authorization while rolling, this being prejudicial to safety.

Furthermore, the use of a usual device such as this, in the rolling phases, demands great attention from the pilot in order to monitor the symbols displayed, this being done to the detriment of the knowledge of the outside situation.

SUMMARY OF THE INVENTION

The present invention relates to a method for aiding the ground navigation of an aircraft on an airport, which makes it possible to remedy the aforementioned drawbacks.

For this purpose, according to the invention, said method according to which the following series of operations is carried out in a repetitive manner:

a) the current position and the current heading of the aircraft are determined automatically;
b) with the aid of said current position and of said current heading, as well as of information arising from an airport database, the current traffic lane of the airport, on which the aircraft is situated, is determined automatically; and
c) a first symbol illustrating said current traffic lane is presented with the aid of a head-up display system, overlaid on the environment existing in front of the aircraft, is noteworthy in that:

in step b), parameters relating to the next intersection of the current traffic lane are determined, moreover, with the aid of said current position and of said current heading, as well as of information arising from said airport database, said parameters comprising:
  the position of this next intersection;
  the distance between this position and the current position of the aircraft;
  characteristics of the traffic lanes which cross the current traffic lane at this next intersection; and
  the angles between these traffic lanes and said current traffic lane; and
in step c), a set of second symbols illustrating respectively said parameters relating to the next intersection, which have been determined in step b), is moreover presented with the aid of said head-up display system, overlaid on the environment existing in front of the aircraft.

Thus, by virtue of the invention, the pilot is informed, at any moment, at one and the same time of the current position of his aircraft on the current traffic lane and of the characteristics of the next intersection. Concerning these characteristics, all the necessary information is made available to the pilot so that he can get an accurate idea of the situation encountered at the next intersection, viz.:

the position of this next intersection;
the distance between this position (of the next intersection) and the current position of the aircraft;
characteristics such as the name or the type (taxiway, runway, parking, etch) of the various traffic lanes which cross the current traffic lane at this next intersection; and
the angles between these traffic lanes and the current traffic lane.

Moreover, as all this information is presented on a head-up display system, the pilot does not have to look down to ascertain this information (which he needs at the next intersection), and he can continue to look outside in particular so as to direct the aircraft rolling on the ground, thereby making it possible in particular to reduce the risk of collision with another craft, mobile or not, situated on a traffic lane.

Moreover, the implementation of the present invention does not require the knowledge of a rolling authorization given by a controller. Hence, in the event that such an authorization is modified, no manipulation on the part of the pilot is necessary.

In a preferred embodiment, said airport database comprises data making it possible to represent the set of traffic lanes and intersections of the airport with the aid of an oriented graph, the vertices of the graph representing the traffic lanes and oriented arcs representing the intersections, with each arc being associated the name of the intersection, its geographical position and the angle between the traffic lanes.

Furthermore, preferably, in step b), to determine the parameters relating to the next intersection, the following successive operations are carried out:

α) with the aid of the current traffic lane and of said airport database, the set of intersections existing on this current traffic lane is determined;

β) from among the set of these intersections, the intersection closest to the front of the aircraft is selected with the aid of the current heading and of the current position of the aircraft, as well as of the positions of said intersections, which arise from said airport database; and γ) for the closest intersection thus selected, the following are determined with the aid of the airport database:

characteristics of the traffic lanes which cross the current traffic lane at this closest intersection; and the angles between these traffic lanes and the current traffic lane.

This therefore yields a simple, fast and effective procedure for determining the parameters relating to the next intersection. This procedure is particularly well suited to a database such as that aforementioned, for which a representation in the form of an oriented graph is used.

Additionally, in a first embodiment, in step c), said first symbol and said set of second symbols are presented, with the aid of said head-up display system, at a fixed position on a transparent screen of said head-up display system.

Furthermore, in a second embodiment, in step c), said first symbol and said set of second symbols are presented, with the aid of said head-up display system, according to a conformal representation so that said symbols are overlaid directly on the real positions of the parameters that they represent.

Additionally, in a particular variant embodiment:

the current position of the aircraft with respect to the runways of the airport is monitored so as to be able to emit an alert signal when the aircraft is situated in proximity to a runway; and if such an alert signal is emitted, a third symbol indicating this alert is presented with the aid of said head-up display system, overlaid on the environment existing in front of the aircraft.

By virtue of this variant embodiment, the pilot is informed each time that the aircraft is approaching a runway (landing or takeoff) that he is generally prohibited to cross or to follow as long as no controller has given the authorization in this regard. As, moreover, the third symbol which indicates such a runway proximity is displayed head-up, the pilot who is looking outside in order to drive his aircraft is alerted in an effective manner.

Furthermore, in a particular variant embodiment, auxiliary symbols illustrating respectively:

the current heading of the aircraft;

the current ground speed of the aircraft; and an information cue relating to the acceleration or deceleration of the aircraft, are moreover determined and are moreover presented with the aid of said head-up display system, overlaid on the environment existing in front of the aircraft.

The above variant embodiments improve safety during ground rolling and allow better anticipation by the pilot of any situation liable to be dangerous.

The present invention also relates to a device for aiding the ground navigation of an aircraft on a traffic lane of an airport.

According to the invention, said device of the type comprising:

first means for automatically determining the current position and the current heading of the aircraft;

an airport database;

second means for automatically determining, with the aid of said current position and of said current heading, as well as of information extracted from said airport database, the current traffic lane of the airport, on which the aircraft is situated; and a head-up display system for presenting, overlaid on the environment existing in front of the aircraft, a first symbol illustrating said current traffic lane, is noteworthy in that:

said second means determine, moreover, with the aid of said current position and of said current heading, as well as of information extracted from said airport database, parameters relating to the next intersection of the current traffic lane, said parameters comprising:

the position of this next intersection;

the distance between this position and the current position of the aircraft;

the characteristics of the traffic lanes which cross the current traffic lane at this next intersection; and the angles between these traffic lanes and said current traffic lane; and said head-up display system moreover presents, overlaid on the environment existing in front of the aircraft, a set of second symbols illustrating respectively said parameters relating to the next intersection, which have been determined by said second means.

In a first embodiment, said second means form part of an onboard system for aiding ground navigation, preferably of OANS ("On-board Airport Navigation System") type.

Furthermore, in a second simplified embodiment, for which said head-up display system comprises a calculation means, a projection means and a head-up transparent screen, said second means are integrated directly into said calculation means of said head-up display system, thereby making it possible to simplify the realization of the device in accordance with the invention and in particular to reduce the wiring.

The present invention also relates to an aircraft, in particular a transport aircraft, which is equipped with a device for aiding navigation such as that aforementioned.

The figures of the appended drawing will elucidate the manner in which the invention may be embodied. In these figures, identical references designate similar elements.

BRIEF DESCRIPTION OF THE DRAWINGS

FIG. 5 is an oriented graph, which is used in a preferred embodiment to determine characteristics of a next intersection.

DETAILED DESCRIPTION OF THE INVENTION

Figure 1:
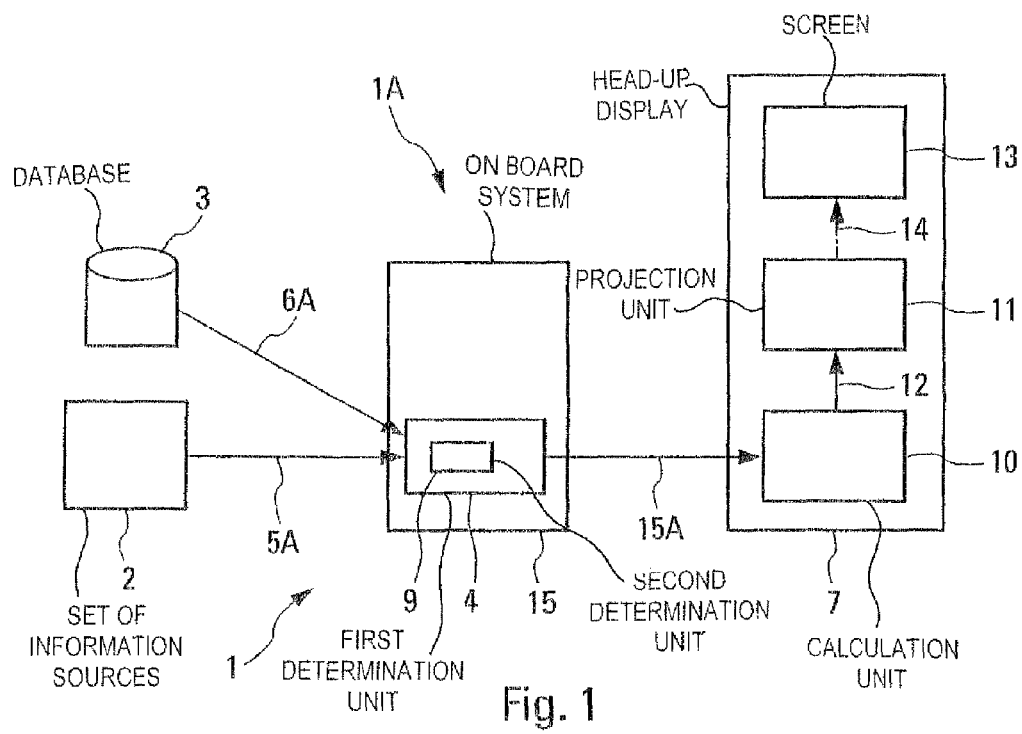
FIGS. 1 and 2 are schematic diagrams of two different embodiments of a device for aiding airport navigation in accordance with the invention.
Figure 2:
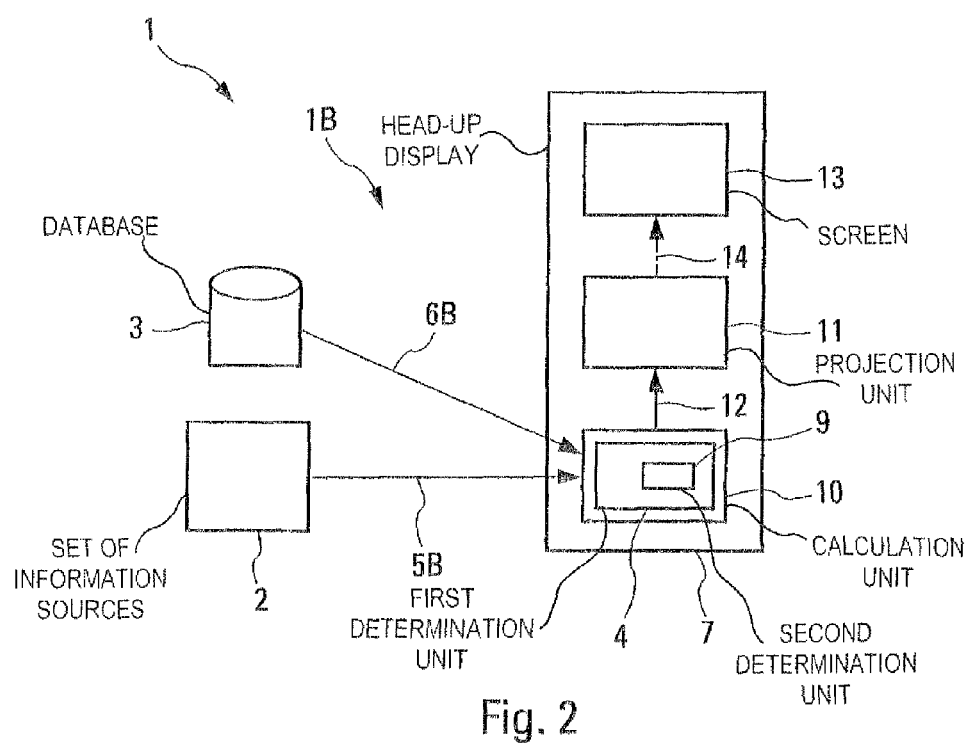

The device 1 in accordance with the invention and represented according to two embodiments 1A and 1B respectively in FIGS. 1 and 2, is intended to aid the airport navigation of an aircraft (not represented), in particular a transport aircraft, civilian or military, that is to say to aid to guide the aircraft when it is rolling along the ground on a traffic lane (taxiway, runway, etc.) of the airport.

Said device 1 which is onboard, is of the type comprising:
- a set 2 of usual information sources, which are intended to automatically determine the current values of parameters of the aircraft, and in particular its current position and its current heading;
- an airport database 3, which comprises information on the airport installations, in particular on the traffic lanes;
- means 4 which are connected by way of links 5A, 5B and 6A, 6B respectively to said set 2 and to said means 3 and which are formed so as to automatically determine, with the aid of said current position and of said current heading, received from said set 2, as well as of information extracted from said airport database 3, the current (or actual) traffic lane of the airport, on which the aircraft is currently situated; and
- a head-up display system 7 which presents, overlaid on the environment existing in front of the aircraft, at least one first symbol 8 which illustrates the current traffic lane.

According to the invention:
- said means 4, for example a computer, comprise means 9 for determining, moreover, with the aid of said current position and of said current heading, received from said set 2, as well as of information extracted from said airport database 3, parameters relating to the next intersection of the current traffic lane, that is to say of the intersection that the aircraft will reach first, starting from its current position in the direction indicated by its current heading along the current traffic lane. Said parameters comprise in particular:
    - the geographical position (coordinates) of this next intersection;
    - the distance between this position (of the next intersection) and the current position of the aircraft;
    - characteristics such as the name and the type (taxiway, runway, parking) of the traffic lane or traffic lanes which cross the current traffic lane at this next intersection; and
    - the angles between these traffic lanes and said current traffic lane; and
- said head-up display system 7 is formed so as to present moreover, overlaid on the environment existing in front of the aircraft, a set E of second symbols (specified below) illustrating respectively said parameters relating to the next intersection, which have been determined by said means 9.

Thus, the device 1 in accordance with the invention makes it possible to inform the pilot of the aircraft, at any moment, at one and the same time of the current position of his aircraft on the current traffic lane and of the characteristics of the next intersection. Concerning these characteristics, said device 1 makes all the necessary information available to the pilot so that he can get an accurate idea of the situation encountered at the next intersection, viz.:
- the position of this next intersection;
- the distance between this position (of the next intersection) and the current position of the aircraft;
- characteristics such as the name or the type (taxiway, runway, parking, etc.) of the various traffic lanes which cross the current traffic lane at this next intersection; and
- the angles between these traffic lanes and the current traffic lane.

Moreover, as all this information is presented on a head-up display system 7, the pilot does not have to look down in order to ascertain this information (which he needs at the next intersection), and he can continue to look outside in particular so as to direct the aircraft rolling on the ground, thereby making it possible in particular to reduce the risk of collision with another craft, mobile or not, situated on a traffic lane of the airport.

Moreover, the device 1 does not require the knowledge of a rolling authorization given by a controller. Hence, in the event of such an authorization being modified, no manipulation on the part of the pilot is necessary.

As represented in FIGS. 1 and 2, said head-up display system 7 comprises, in a usual manner:
- a calculation means 10 which is in particular intended to form an image with the aid of information received;
- a projection means 11 which receives the image formed by said calculation means 10 by way of a link 12 and which is intended to project this image onto a transparent screen 13, as illustrated by a chain-dotted link 14; and
- said transparent screen 13 which is mounted in the head-up position, on the windshield of the flight deck of the aircraft, in the pilot's visual field, in particular so as to be able to be folded down (during projection) and be raised up again (in the absence of projection) to completely free the visual field.

In a particular embodiment, said device 1 comprises moreover:
- means, in particular said means 4 or means forming part of the set 2, for monitoring the current position of the aircraft with respect to the runways of the airport (whose positions are in particular known from said airport database 3) so as to be able to emit an alert signal (in particular destined for said system 7) when the aircraft is situated in proximity to a runway, that is to say when it is situated at a distance (or at a rolling duration) which is less than a predetermined distance (or than a predetermined rolling duration) of said runway; and
- if such an alert signal is emitted, said head-up display system 7, presents, moreover, overlaid on the environment existing in front of the aircraft, a third symbol 25 specified below which indicates this alert.

Thus, the pilot is informed each time that the aircraft is approaching a runway (landing or takeoff) that he is generally prohibited to cross or to follow as long as no controller has given the authorization in this regard. As, moreover, the third symbol 25 which indicates such a runway proximity is displayed head-up, the pilot who is looking outside in order to drive his aircraft is alerted in an effective manner.

Furthermore, in another embodiment, said device 1 comprises means (not represented) forming for example part of the set 2 for determining respectively:
- the current heading of the aircraft;
- the current ground speed of the aircraft; and
- an information cue relating to the acceleration or deceleration of the aircraft.

Moreover, in this case, said head-up display system 7 presents overlaid on the environment existing in front of the aircraft, auxiliary symbols 16B, 17B and 18B specified below, which illustrate respectively said current heading, said ground speed, and said acceleration or deceleration information cue.

The above embodiments improve safety during ground rolling and allow better anticipation by the pilot of any situation liable to be dangerous.

In the first embodiment 1A represented in FIG. 1, said means 4, in particular a computer, form part of a onboard system 15 for aiding ground navigation, of OANS ("Onboard Airport Navigation System") type. In a usual manner, this system 15 can also comprise a head-down display means (not represented).

In this first embodiment, said means 4 are connected by way of a link 15A, for example, of AFDX type or of ARINC 429 type, to said calculation means 10 of the head-up display system 7.

In this first embodiment, said means 4 receive from said set 2, by way of the link 5A, the current position, the current heading and the current speed of the aircraft, and they transmit to said calculation means 10, in particular:
information relating to the current traffic lane, in particular:
the name; and
the type (taxiway, runway, parking, etc.) of this current traffic lane; and
information relating to the next intersection, in particular:
the geographical position (coordinates) of this next intersection;
the distance between this position (of the next intersection) and the current position of the aircraft, along the current traffic lane;
characteristics (name, type) of the traffic lane or various traffic lanes which cross the current traffic lane at this next intersection; and
the angles between these traffic lanes and said current traffic lane.

Said means 4 can also transmit, if appropriate, an information cue relating to a runway proximity alert, and in particular:
the validity of the alert; and
the heading of the runway (preferably of QFU type) to which the alert pertains.

With the aid of the data received from said means 4, said calculation means 10 generates the symbols which constitute the image to be displayed, which it transmits to said projection means 11.

Furthermore, in the second embodiment represented in FIG. 2, said means 4 are integrated directly into said calculation means 10 of the head-up display system 7.

Thus, a simplified architecture of the device 1 is obtained, for which it is in particular possible to dispense with links between the means 4 and the calculation means 10.

In this second embodiment, the calculation means 10 is connected directly by way of links 5B and 6B respectively to said set 2 and to said airport database 3. It carries out the aforementioned processing operations, then it uses the information obtained to form an image to be displayed.

Figure 3:
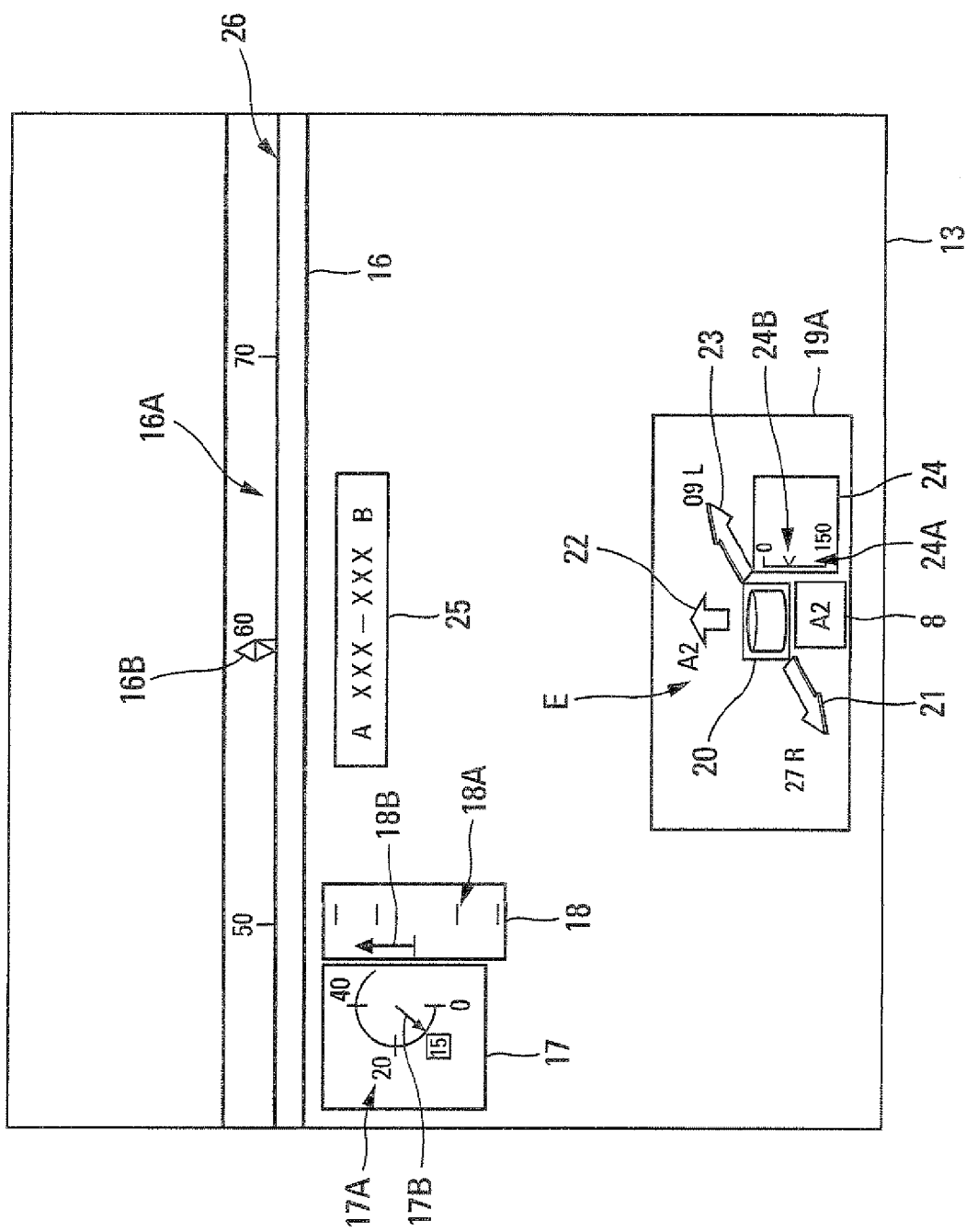
FIGS. 3 and 4 schematically illustrate displays implemented according to the invention, in accordance respectively with two different representations.

Additionally, in a first variant embodiment, said head-up display system 7 produces a first display, such as represented for example in FIG. 3, for which the various symbols of the image displayed are situated at a fixed position on the transparent screen 13.

In this example of FIG. 3, the screen 13 comprises:
a heading display 16 which illustrates a heading scale 16A and a symbol 16B displaying the current heading;
a ground speed display 17 which comprises a ground speed scale 17A and a symbol 17B, in this instance an arrow, which indicates the current ground speed of the aircraft; and
a display 18 providing an information cue relating to the acceleration or deceleration of the aircraft, which comprises a scale 18A and a symbol 18B, in this instance an arrow, which highlights the current acceleration (or deceleration).

Moreover, the first symbol 8 and the set E of second symbols are displayed on a display window 19A which comprises in particular:

said symbol 8 which provides the name (in this instance "A2") of the current traffic lane. The font of the writing relating to this lane can be different according to the type of traffic lane (taxiway, runway, parking);
a direction dot 20 around which are displayed direction arrows 21, 22 and 23 represented in perspective. Each arrow 21, 22, 23 around the direction dot 20 is associated with a direction that will be found at the next intersection. The positions of the arrows 21, 22, 23 around the direction dot 20 are representative of the angles formed in reality between the traffic lanes. At the tip of each arrow, the name of the traffic lane, with which this arrow is associated (viz. "27R" for the arrow 21, "A2" for the arrow 22, and "09L" for the arrow 23) is displayed. The font of the name of the traffic lane at the extremity of an arrow is different depending on the type of traffic lane which is indicated. The graphic for this arrow can also be different depending on the type of traffic lane; and
a symbol 24 which relates to an information cue regarding the distance to the next intersection. This symbol 24 comprises a set 24A which consists, preferably, of a vertical dash with small horizontal dashes at the ends of this vertical dash. A cursor 24B moves between the two horizontal dashes. To the right of the two horizontal dashes are displayed the numbers 0 at the top and 150 at the bottom. The cursor 24B moving between these two limits makes it possible to indicate the remaining distance in meters (or in feet) before reaching the intersection.

In a particular embodiment, said device 1 also displays a symbol 25 which relates to a runway proximity alert. This symbol 25 which is positioned just under the horizon line 26 consists of a text "A XXX-XXX B" which is enclosed in a frame. XXX-XXX represents the heading of QFU type of the runway (from which the alert stems), which is followed by the label L, M or R (for example 27R-09L). Moreover, the letters A and B can represent words so as to form a text indicating the presence of the runway XXX-XXX straight ahead of the aircraft, for example the text "RUNWAY XXX-XXX AHEAD".

Figure 4:
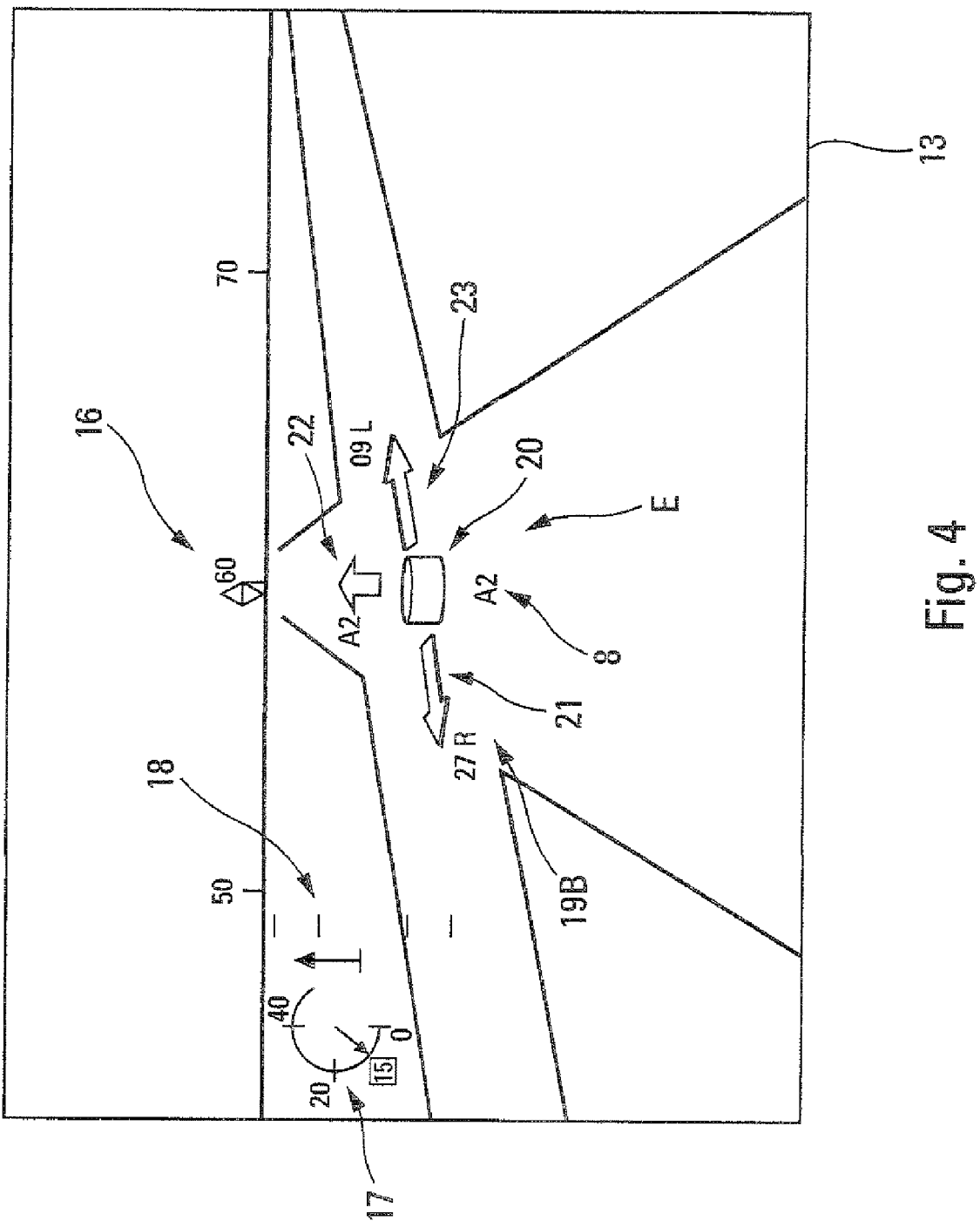

Additionally, in a second variant embodiment represented in FIG. 4, the display window 19B (comprising the symbol 8 and the set E) is no longer fixed on the screen 13, but becomes mobile. More precisely, it is disposed so as to be overlaid permanently at the next real intersection. The continuous line plots, which show the traffic lanes "A2", "27R" and "09L" in FIG. 4, are not displayed plots, but represent the real verges of these traffic lanes which are visible through the transparent screen 13. The distance information becoming implicit, the symbol 24 is deleted from the display window 19B.

In this second variant embodiment, the head-up display system 7 therefore produces a conformal representation so that said symbols 8, 20, 21, 22, 23 are overlaid directly on the real positions of the parameters that they represent.

Additionally, it is known that the databases defined by the usual ARINC 816 standard are provided in the form of XML-type files. They contain numerous elements and use an architecture of object-attribute type. The main aim of this standard is to allow easy display in graphical form.

In a preferred embodiment, the procedure implemented by the means 4 for detecting the next intersection relies on the use of an oriented graph. The vertices of the graph represent the traffic lanes, while the oriented arcs represent the intersections. With each arc are associated the name of the intersection, its geographical position, and the angle between the traffic lanes. Represented in FIG. 5, by way of illustration, is a part of a graph G which is oriented towards the North N, as shown by an arrow 27, and which comprises.
- traffic lanes S1 to S5; and
- intersections I1 and I2.

Reading this graph G of FIG. 5 therefore makes it possible to ascertain that to go from traffic lane S1 to traffic lane S2, it is necessary to use intersection I1 and to turn by an angle of 90°. The set of traffic lanes and intersections of the airport is thus represented with the aid of a graph of this type.

On the basis of this graph G, the means 4 can easily determine the following intersection, and the information characterizing it, with the aid of integrated means (not represented) which carry out successively (respectively) the following operations:
- determine, on the basis of the aircraft's current position PO (represented in FIG. 5 to facilitate understanding) which is known from the set 2, the name of the current traffic lane (with the aid of the base 3), viz. the lane S1 in the example of FIG. 5;
- determine, with the aid of the graph G, the set of intersections I1 and I2 that it is possible to take from this current traffic lane S1;
- select, from among the set of these intersections I1 and I2, the closest intersection I1 which is situated in front of the aircraft, using for this purpose the current heading of the aircraft and the current position PO of the aircraft (received from the set 2) and the positions of the intersections (instruction of the base 3); and
- once this closest intersection I1 has been selected, determine with the aid of the graph G, the traffic lanes S2 and S4 that it is possible to take at this next intersection, as well as the angles that these traffic lanes S2 and S54 form between themselves and with the current traffic lane S1.

It will be noted that with the definition of the ARINC 816 standard for airport databases, it is not possible to construct such a graph G, since there is no information relating to intersections. Hence, to obtain such a graph G, it is appropriate to supplement these usual databases with the definition of an intersection object, having the following attributes:
- number;
- position (latitude, longitude);
- lane object 01;
- lane object 02

These objects 01 and 02 give information on the lanes that it is possible to take at the intersection, such as the name and the heading of the traffic lane from the intersection. Hence, object 01 can be the name of the lane, and object 02 can be the heading of the lane, starting from the intersection to which it is tied. Said airport database 3 of the device 1 can be a database of this type, thus supplemented.

The invention claimed is:

1. A method for aiding ground navigation of an aircraft on an airport, the method comprising:
   a) determining, by a set of information sources, current position and current heading of the aircraft;
   b) determining, by a first determination unit, according to said determined current position and said determined current heading, and according to information obtained from an airport database, a current traffic lane of the airport on which the aircraft is situated, and parameters relating to a next intersection of the current traffic lane, wherein said parameters relating to the next intersection include the following:
      position of the next intersection; and
      distance between the next intersection and the current position of the aircraft; and
   c) overlaying, by a head-up display unit, on an environment in front of the aircraft, a first symbol illustrating said determined current traffic lane, and a set of second symbols illustrating the determined parameters of the next intersection, wherein:
   the following parameters relating to the next intersection of the current traffic lane are determined by the first determination unit;
   characteristics of traffic lanes that cross the current traffic lane at the next intersection; and
   angles between the crossing traffic lanes and said current traffic lane; and
   the following steps are carried out by the first determination unit:
      α) determining, according to the current traffic lane and the information of said airport database, a set of intersections on the current traffic lane;
      β) selecting from among the set of intersections, an intersection closest to the front of the aircraft, according to the determined current heading and the determined current position of the aircraft, obtained from the information of said airport database; and
      γ) determining, according to information of the airport database (3):
         characteristics of the crossing traffic lanes at the selected closest intersection; and
         angles between the crossing traffic lanes and the current traffic lane.

2. The method as claimed in claim 1, wherein the traffic lanes and set of intersections of the airport are overlaid as an oriented graph, wherein the oriented graph includes vertices representing the traffic lanes and oriented arcs representing the set of intersections, with each arc being associated a name of the intersection, a geographical position of the intersection and angle between the traffic lanes.

3. The method as claimed in claim 2, wherein, a definition of an intersection object is added to a database to obtain the oriented graph.

4. The method as claimed in claim 1, wherein in said first symbol and said set of second symbols are overlaid at a fixed position on a transparent screen of said head-up display system.

5. The method as claimed in claim 1, wherein in said first symbol and said set of second symbols are overlaid as a conformal representation in which said symbols are overlaid on the environment in front of the airplane at positions representative of actual positions on the airport.

6. The method as claimed in claim 1, wherein:
the current position of the aircraft is monitored and an alert signal is emitted when the aircraft is situated in proximity to a runway; and
when the alert signal is emitted, a third symbol indicating the alert signal is overlaid by said head-up display system on the environment in front of the aircraft.

7. The method as claimed in claim 1, wherein auxiliary symbols illustrating respectively:
a current heading of the aircraft;
a current ground speed of the aircraft; and
an information cue relating to the acceleration or deceleration of the aircraft,
are determined and presented overlaid by said head-up display system on the environment in front of the aircraft.

8. A device for aiding ground navigation of an aircraft on an airport, said device comprising:
- a set of information sources configured to determine current position and current heading of the aircraft;
- an airport database, which comprises airport installation information;
- a first determination unit configured to determine, according to said determined current position and said determined current heading, and according to said information from said airport database, a current traffic lane of the airport on which the aircraft is situated, and parameters relating to a next intersection of the current traffic lane, wherein said parameters relating to the next intersection include the following:
  - position of the next intersection; and
  - distance between the next intersection and the current position of the aircraft; and
- a head-up display system configured to overlay, on an environment in front of the aircraft, a first symbol illustrating said current traffic lane determined by said first determination unit, and a set of second symbols illustrating the parameters of the next intersection determined by said first determination unit, wherein:
  - said first determination unit is further configured to determine the following parameters relating to the next intersection of the current traffic lane:
    - characteristics of traffic lanes that cross the current traffic lane at the next intersection, and
    - angles between the crossing traffic lanes and said current traffic lane; and
  - said first determination unit is additionally configured to carry out the following steps:
    - α) determine, according to the current traffic lane and the information of said airport database, a set of intersections on the current traffic lane;
    - β) select, from the set of intersections, an intersection closest to the front of the aircraft, according to the determined current heading and the determined current position of the aircraft, a position of each intersection in the set of intersections, obtained from the information from said airport database; and
  - said first determination unit is further configured to determine, according to information of the airport database:
    - characteristics of the crossing traffic lanes at the selected closest intersection; and
    - angles between the crossing traffic lanes and the current traffic lane.

9. The device as claimed in claim 8,
wherein said first determination unit forms a part of an onboard system for aiding ground navigation.

10. The device as claimed in claim 8,
wherein said head-up display system comprises a calculation unit, a projection unit and a transparent screen, and said first determination unit is integrated into said calculation unit of said head-up display system (7).

* * * * *